(12) United States Patent
Urata

(10) Patent No.: US 7,324,739 B2
(45) Date of Patent: Jan. 29, 2008

(54) DATA REPRODUCTION METHOD AND DATA REPRODUCTION APPARATUS

(75) Inventor: Kaoru Urata, Kanagawa (JP)

(73) Assignee: Sony Corporation (JP)

( * ) Notice: Subject to any disclaimer, the term of this patent is extended or adjusted under 35 U.S.C. 154(b) by 841 days.

(21) Appl. No.: 10/809,440

(22) Filed: Mar. 26, 2004

(65) Prior Publication Data
US 2004/0197085 A1 Oct. 7, 2004

(30) Foreign Application Priority Data
Apr. 4, 2003 (JP) ............................. P2003-101304

(51) Int. Cl.
H04N 7/00 (2006.01)
(52) U.S. Cl. ........................................ 386/96; 386/104
(58) Field of Classification Search .................. 386/96, 386/104, 124, 46, 109, 101, 39
See application file for complete search history.

(56) References Cited
U.S. PATENT DOCUMENTS
4,562,581 A * 12/1985 Tanaka et al. ............... 375/219
2005/0163142 A1* 7/2005 Ishii et al. ................... 370/429

FOREIGN PATENT DOCUMENTS
| JP | 63-131375 | 6/1988 |
| JP | 11-213557 | 8/1999 |
| JP | 2000-137951 | 5/2000 |
| JP | 2001-338467 | 12/2001 |
| WO | WO-97/047132 | 11/1997 |

OTHER PUBLICATIONS
Japanese Office Action; Application No. 2003-101304; Dated Mar. 20, 2007.

* cited by examiner

Primary Examiner—Robert Chevalier
(74) Attorney, Agent, or Firm—Rader, Fishman & Grauer PLLC; Ronald P. Kananen

(57) ABSTRACT

In a data reproduction method and a data reproduction apparatus in the present invention, video data having a frame frequency of 23.97 Hz is recorded on a tape, and in correspondence with this video data, audio data having a sampling frequency of 48 kHz is also recorded on the tape. In a normal reproduction, video data having a frame frequency of 23.97 Hz is reproduced from the tape. In this case, the rate converter outputs audio data of each field without making any conversion. Contrarily, in a compatibility reproduction, video data having a frame frequency of 25 Hz is reproduced from the tape. In this case, the rate converter outputs the audio data of each field after converting the number of items of sampled data into the number corresponding to the reproduction frame frequency.

10 Claims, 12 Drawing Sheets (23.97Hz)

(25Hz)

(25Hz)

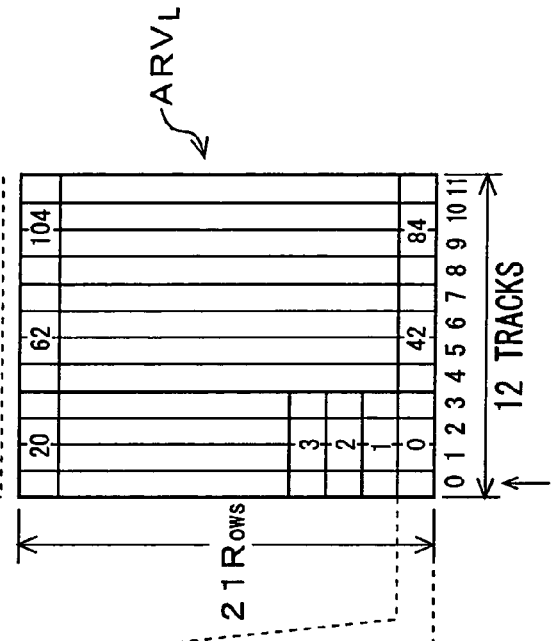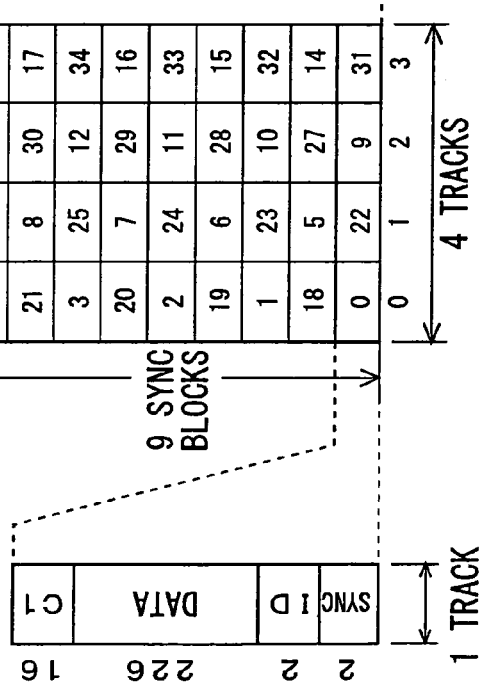

FIG. 10
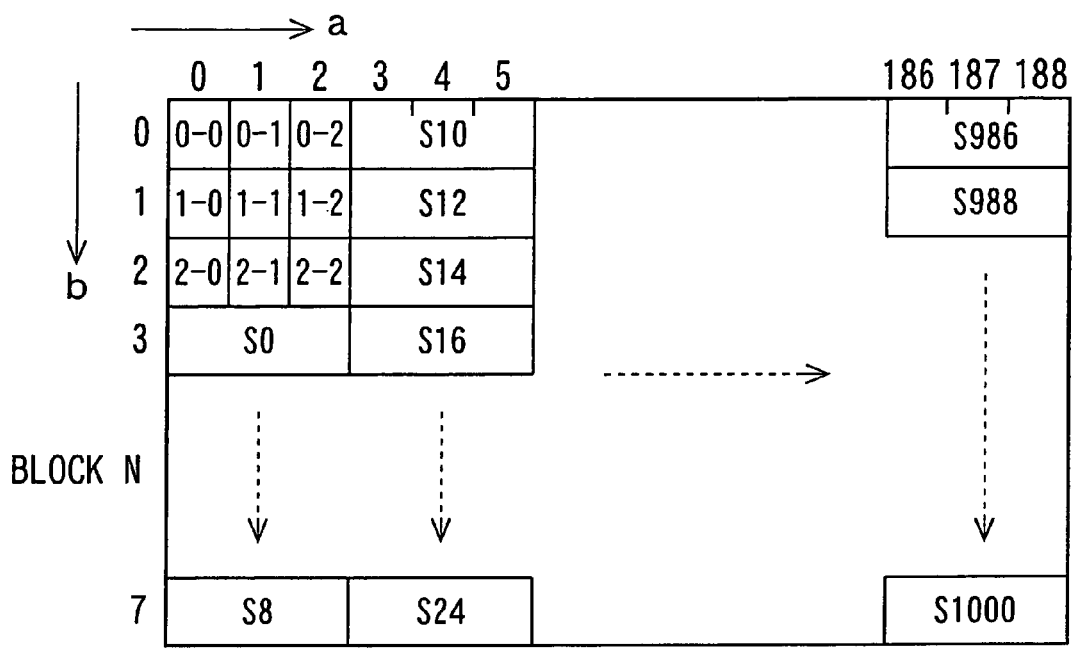
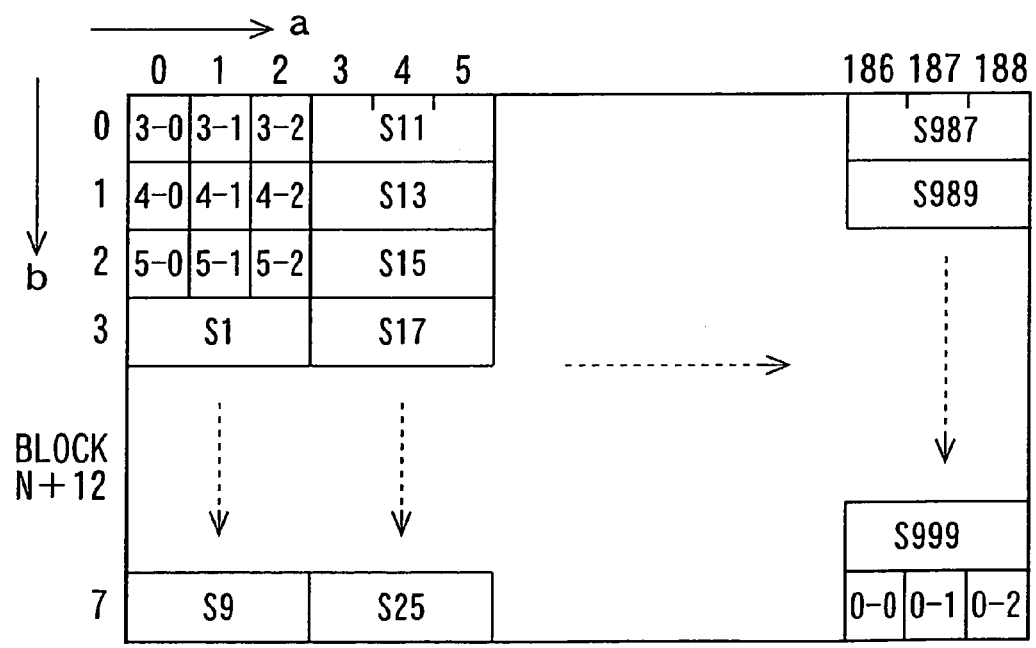

(25Hz)

(23.97Hz)

(23.97Hz)

DATA REPRODUCTION METHOD AND DATA REPRODUCTION APPARATUS

BACKGROUND OF THE INVENTION

1. Field of the Invention

The present invention relates to a data reproduction method and a data reproduction apparatus. It, particularly, relates to a data reproduction method and data reproduction apparatus wherein audio data having a specific sampling frequency is recorded on a recording medium and the audio data is reproduced from the recording medium.

2. Description of Related Art

Conventionally, there has been known a digital video tape recorder in which video data and audio data are recorded on inclined tracks of a magnetic tape with the video data and the audio data being corresponded to each other. In this type of digital video tape recorder, there has been conceived that video data having a field frequency of 59.94 Hz is recorded after the number of items of sampled audio data having a sampling frequency of 48 kHz for each one frame period has been converted from 1602 (this number corresponds to the sampling frequency of 48 kHz) to 1600 (this number corresponds to the sampling frequency of 47.952 kHz) by a rate converter.

When audio data is recorded as in the manner described above if video data is reproduced at a field frequency of 59.94 Hz in the reproduction, the video data is output after the number of items of the sampled audio data that has been reproduced for each one frame period has been converted from 1600 (this number corresponds to the sampling frequency of 47.952 kHz) to 1602 (this number corresponds to the sampling frequency of 48 kHz) by the rate converter.

On the other hand, in a compatibility reproduction in which the video data is reproduced at a field frequency of 60 Hz in the reproduction, the video data is output with the number of items of the sampled audio data that has been reproduced for each one frame being kept at 1600 (this number corresponds to the sampling frequency of 48 kHz) without making any conversion.

According to this case, in order to reproduce the video data in the compatibility reproduction at a field frequency of 60 Hz, the data is recorded after the number of items of the sampled audio data for each one frame period has been converted from 1602 to 1600 by a rate converter and, when the data is reproduced in a normal reproduction at a field frequency of 59.94 Hz, the number of items of the sampled audio data for each one frame period is converted from 1600 to 1602. This causes a problem such that the reduction in the number of items of sampled data at the time of recording the audio data results in bandwidth limitation and filter rounding error in the rate converter, thereby deteriorating into sound quality.

An objective of the present invention is to present a data reproduction method and a data reproduction apparatus by which a compatibility reproduction is allowed without inducing deterioration in sound quality if a normal reproduction is performed.

SUMMARY OF THE INVENTION

According to the present invention, in a data reproduction method for reproducing audio data from a recording medium in which audio data having a specific sampling frequency is recorded every first period of time by a length of the first period of time, the audio data reproduced every said first period of time is output with the number of items of sampled audio data being kept unchanged when the audio data of the first period of time recorded every said first period of time is reproduced every the first period of time. When the audio data of the first period of time recorded every the first period of time is reproduced every second period of time, which is different from the first period of time, the audio data is output with the number of items of sampled audio data reproduced every said second period of time being converted into the number corresponding to the second period of time.

Further, according to the present invention, a data reproduction apparatus comprises a reproducer for reproducing audio data from a recording medium in which the audio data having a specific sampling frequency is recorded every first period of time by a length of the first period of time. It also comprises a rate converter for outputting, when the reproducer produces every first period of time the audio data of the first period of time recorded every said first period of time, the audio data reproduced every said first period of time with the number of items of sampled audio data being kept unchanged, whereas for outputting, when the reproducer produces the audio data of the first period of time recorded every said first period of time, the audio data every second period of time that is different from the first period of time, with the number of items of sampled audio data being converted into the number corresponding to the second period of time, the sampled audio data being reproduced every said second period of time.

According to the present invention, in another data reproduction method for reproducing video data and audio data from a recording medium in which the video data having a first frame frequency is recorded, and the audio data having a specific sampling frequency is recorded every specific period of time by a length of the specific period of time, which is an integer times larger than or is smaller by a factor of an integer than the frame period of said video data, the audio data corresponding to the video data, the audio data of the specific period of time is output, when the video data is reproduced at said first frame frequency, with the number of items of sampled audio data being kept unchanged, the sampled audio data being sequentially reproduced in correspondence with the video data. When the video data is reproduced at a second frame frequency that is different from the first frame frequency, the audio data of the specific period of time is output with the number of items of sampled audio data being converted into the number of items corresponding to the second frame frequency, the sampled audio data being sequentially reproduced in correspondence with the video data.

Further, according to the present invention, another data reproduction apparatus comprises a reproducer for reproducing video data and audio data from a recording medium in which the video data having a first frame frequency is recorded, and the audio data having a specific sampling frequency and corresponding to said video data is recorded every specific period of time by a length of the specific period of time, which is an integer times larger than the frame period of the video data or is smaller by a factor of an integer than the frame period of the video data. It also comprises a rate converter for outputting, when the video data is reproduced at the first frame frequency, the audio data of the specific period of time with the number of items of sampled audio data being kept unchanged, the sampled audio data being sequentially reproduced in correspondence with the video data, whereas, for outputting, when the reproducer reproduces the video data at a second frame frequency that is different from the first frame frequency, the audio data of the specific period of time with the number of items of sampled audio data being converted into the number corresponding to the second frame frequency, the sampled audio data being sequentially reproduced in correspondence with the video data.

In the present invention, for example, the specific period of time is one field period, which is a half of the frame period of the video data. In addition, for example, the recording medium is a tape recording medium. A plurality of sync blocks is recorded on one or a plurality of inclined tracks of this tape recording medium. Each of the sync blocks is reproduced from the video data and the audio data of the specific period of time. In this case, for example, the video data and the audio data of the specific period of time are respectively divided into one or a plurality of encoding units. Error-correction encoding is performed for each divided encoding unit by use of a product code. Each of the sync blocks is formed by adding an internal encoding parity to data string that constitutes an internal encoding calculation data stream.

In a normal reproduction in which the video data is reproduced at a first frame frequency, for example, at 23.97 Hz, the audio data sequentially reproduced in correspondence with the video data is output as it is with the number of items of sampled audio data of a specific period of time being kept unchanged. On the other hand, in a compatibility reproduction in which the video data is reproduced at a second frame frequency, which is different from the first frame frequency, for example, at 25 Hz, the audio data of a specific period of time that is sequentially reproduced in correspondence with this video data is output with the number of items of sampled audio data being converted into the number corresponding to the second frame frequency by a rate converter.

In this case, when the video data is reproduced in a normal reproduction at a first frame frequency, there is no need of converting the number of items of sampled audio data of each specific period of time. No reduction in the number of items of sampled data causes problems such as bandwidth limitation and filter rounding error in a rate converter, resulting in no deterioration in sound quality.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 7A to 7C are diagrams each for illustrating an arrangement of sync blocks (video data) within twelve tracks;

FIG. 10 is a diagram for showing a sample data of audio data to be arranged in the ECC block of the block N and block N+12;

DETAILED DESCRIPTION OF THE PREFERRED EMBODIMENTS OF THE INVENTION

Figure 1:
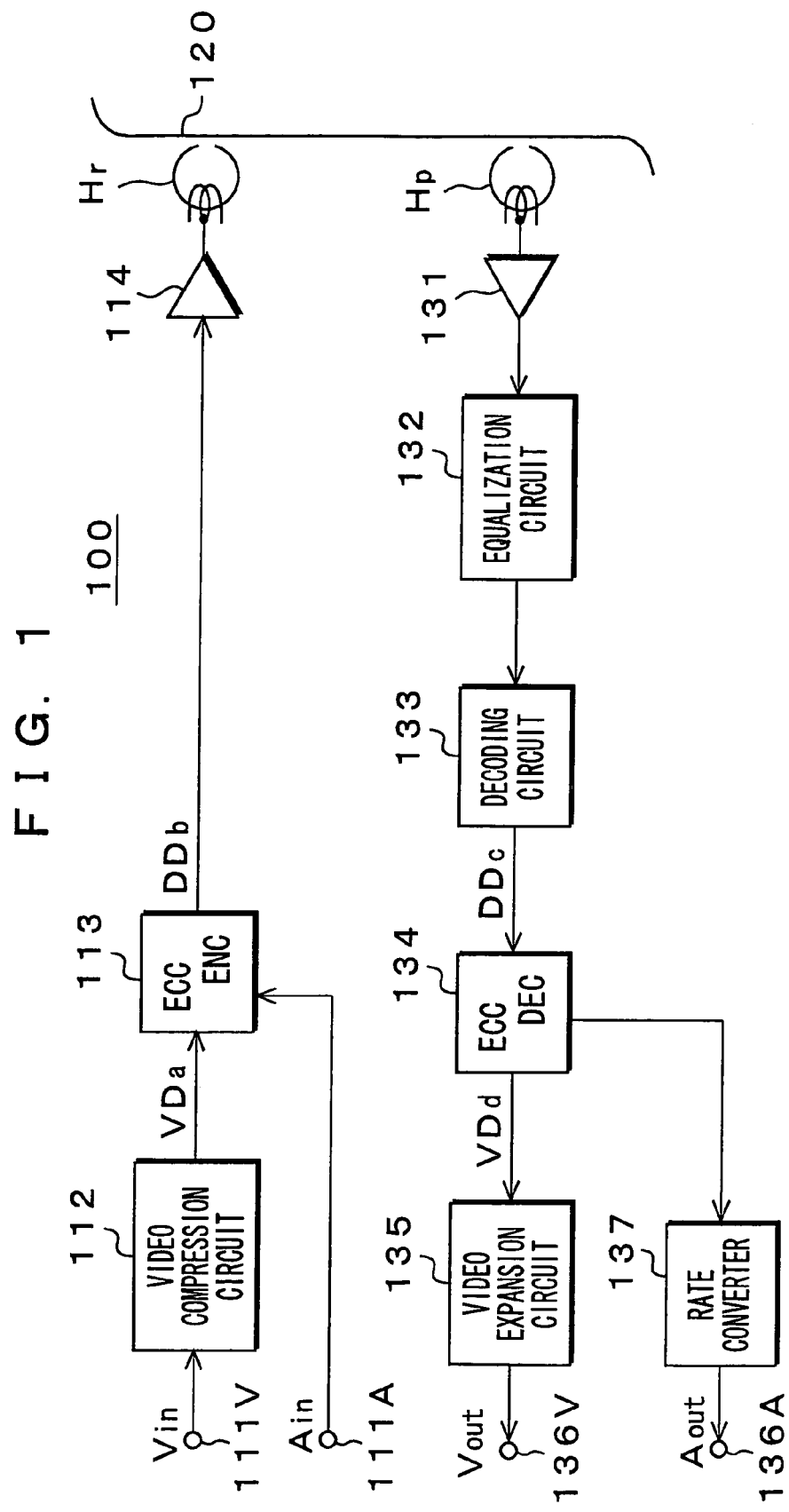
FIG. 1 is a block diagram for showing a configuration of a recording and reproduction apparatus as an embodiment of the invention.

Hereinafter, embodiments of the present invention will be described with reference to drawings. FIG. 1 shows a basic configuration of a recording and reproduction apparatus 100 as an embodiment of this invention.

First, a recording system will be described. A vide compression circuit 112 receives digital video data Vin, which has been input into an input terminal 111V. The video data Vin has a frame frequency of 23.97 Hz. The video compression circuit 112 divides the video data Vin into two-dimensional blocks of 8×8 pixels, for example, and then performs data-compression for the resultant video data by use of block encoding such as DCT.

An ECC encoder 113 then receives video data (compression encoded data) VDa from the video compression circuit 112. The ECC encoder 113 also receives digital audio data Ain, which has been input into an input terminal 111A. The audio data Ain has a sampling frequency of 48 kHz. As to this audio data Ain, twelve channels of audio data can be simultaneously input.

The ECC encoder 113 performs error correction encoding on the video data VDa for each encoding unit by use of a product code, and performs error correction encoding on the audio data Ain for each encoding unit by use of a product code. The recording data (error-correction encoded data) DDb output from the ECC encoder 113 is supplied to a recording head Hr via a recording amplifier 114 so as to be sequentially recorded on inclined tracks of a magnetic tape 120.

In this case, the recording data DDb is recorded in its original non-Return-to-Zero (NRZ) format without undergoing digital modulation. Alternatively, the recording data DDb may be recorded after it is subjected to digital modulation.

Next, a reproduction system will be described. A reproduction amplifier 131 amplifies reproduction signal, which has been reproduced on a reproduction head Hp from the inclined tracks of the magnetic tape 120. An equalization circuit 132 then waveform-equalizes it. A decoding circuit 133 receives and decodes the waveform-equalized reproduction signal by utilizing Viterbi algorithm, for example, so as to produce a reproduction data DDc, which corresponds to the recording data DDb output from the above-described ECC encoder 113 in the recording system.

An error correction code (ECC) decoder 134 receives the reproduction data DDc from the decoding circuit 133. The ECC decoder 134 executes error correction for the video data and the audio data by use of the parities (a C1 parity and a C2 parity) added to the reproduction data DDc.

A video expansion circuit 135 then receives the error-corrected video data (compression encoded data) VDd from the ECC decoder 134. The video expansion circuit 135 also performs data expansion through processing reversal of the processing performed by the video compression circuit 112 in the recording system. Then, the video data Vout from the video expansion circuit 135 is output through an output terminal 136.

A rate converter 137 as a rate-converting device receives the error-corrected audio data from the ECC decoder 134. The audio data Aout from the rate converter 137 is output through an output terminal 136A.

In this embodiment, the reproduction is categorized into a normal reproduction and a compatibility reproduction.

As described above, the video data Vin having a frame frequency of 23.97 Hz is recorded on the magnetic tape 120. The normal reproduction means a reproduction for obtaining the video data Vout having a frame frequency of 23.97 Hz from the magnetic tape 120. In this case, the tape traveling speed of the magnetic tape 120 and the rotation speed of the rotation head are set to be identical to those at the time of recording.

On the other hand, as described above, the video data Vin having a frame frequency of 23.97 Hz is recorded on the magnetic tape 120. The compatibility reproduction means a reproduction for obtaining the video data Vout having a frame frequency of 25 Hz from the magnetic tape 120. In this case, at the time of reproduction, the tape traveling speed of the magnetic tape 120 and the rotation speed of the rotating head are set to be 25/23.97 times higher than at the time of recording.

At the time of normal reproduction, the rate converter 137 outputs audio data of each field, which is sequentially supplied from the ECC decoder 134, with the number of items of the sampled audio data being kept unchanged, that is, 1001 items (this number corresponds to the sampling frequency of 48 kHz). At the time of compatibility reproduction, the rate converter 137 outputs audio data of each field, which is sequentially supplied from the ECC decoder 134, with the number of items of the sampled audio data being converted from 1001 items (this number corresponds to the sampling frequency of 50.01 kHz) to 960 items (this number corresponds to the sampling frequency of 48 kHz).

As a result, audio data Aout having a sampling frequency of 48 kHz is obtained at the output terminal 136A in both the normal reproduction where the video data Vout having a frame frequency of 23.97 Hz is produced and the compatibility reproduction where the video data Vout having a frame frequency of 25 Hz is produced.

Figure 2A:
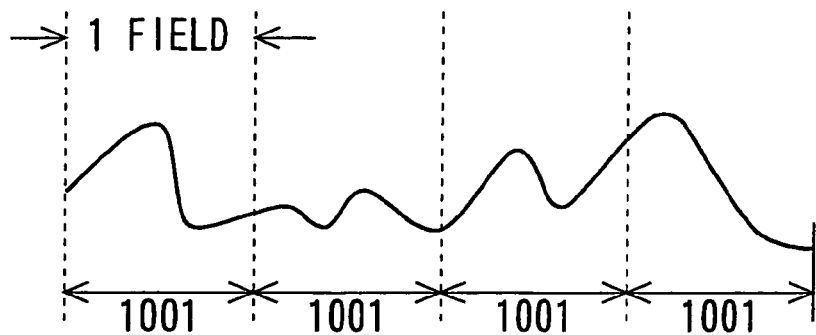
FIGS. 2A to 2C are diagrams each for illustrating a rate conversion performed in a compatibility reproduction where the frame frequency is converted from 23.97 Hz to 25 Hz.

FIG. 2A shows that 1001 items of sampled audio data Ain are recorded in correspondence with each field of the video data Vin. The audio data has a sampling frequency of 48 kHz. The video data has a frame frequency of 23.97 Hz. At the time of normal reproduction, the video data Vout has a frame frequency of 23.97 Hz, which is identical to the frame frequency of the video data Vin at the time of recording using 1001 items of the sampled audio data reproduced in each field of the video data Vout without making any conversion allows audio data Aout having a sampling frequency of 48 kHz to be produced.

Figure 2B:
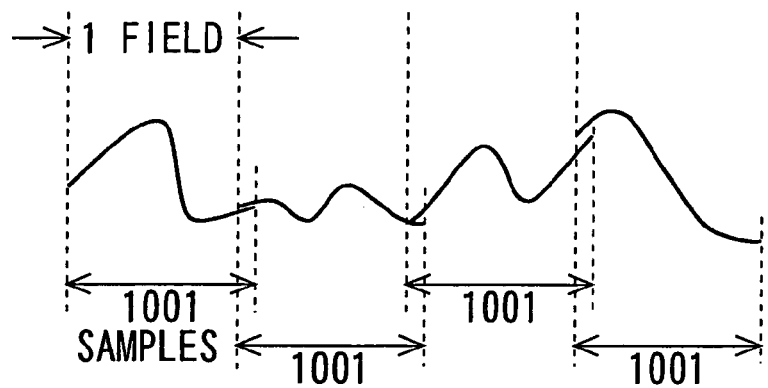

On the contrary, at the time of compatibility reproduction, the video data Vout has a frame frequency of 25 Hz, which is higher than the frame frequency of the video data Vin at the time of recording. If the audio data having a sampling frequency of 48 kHz is constituted by 1001 items of the sampled audio data reproduced in each field of the video data Vout without making any conversion, the period of the resultant audio data is longer than one field period as shown in FIG. 2B. This is inconvenient.

Figure 2C:
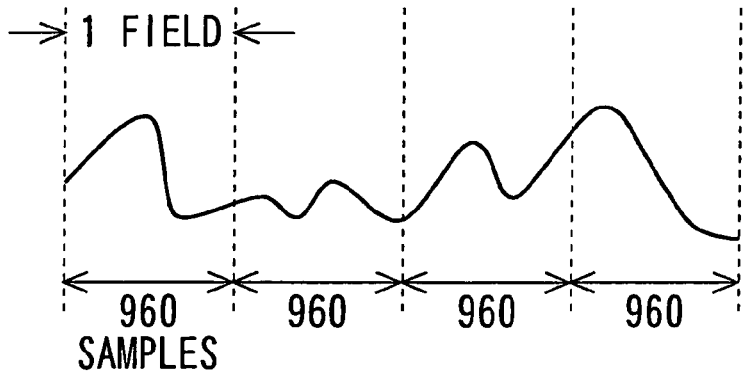

As described above, in order to avoid such an inconvenience, the rate converter 137 converts the number of items of the sampled audio data reproduced in each field of the video data Vout from 1001 items to 960. The 960 items of the sampled audio data obtained as a result of conversion is then used to constitute the audio data having a sampling frequency of 48 kHz in each field. Thereby, the period of the resultant audio data becomes equal to one field, as shown in FIG. 2C. As a result, audio data in each field can be satisfactorily continued.

It is required that an interface capable of transmitting all of the sampled data in each field is provided between the ECC decoder 134 and the rate converter 137 in accordance with the reproduction frame frequency. This embodiment employs an interface capable of transmitting audio data of 2 channels in a serial transmission at a transmission rate of 128 fs (fs means 48 kHz).

In this case, each sampled data is transmitted in a signal format in which 8-bit header is added to a 24-bit data. Therefore, when the frame frequency is 25 Hz, it is possible to transmit 1920 items $(=(128\times48\times10^3)/(50\times32\times2))$ of the sampled data per one channel in the period of one field. However, as described above, the number of items of the sampled data of one field, which can be transmitted through one channel, is 1001. Therefore, when 1001 items of the sampled data are transmitted, only the headers of 1001 items of the effective sampled data are provided with valid flags for indicating that these are effective sampled data.

Figure 3:
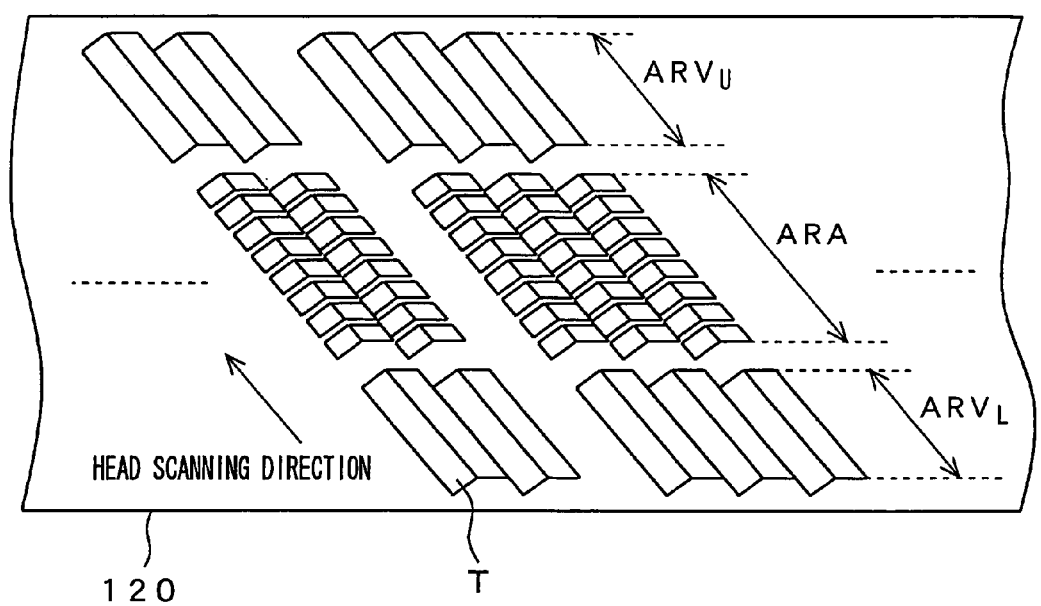
FIG. 3 is a diagram for illustrating a recording format.

FIG. 3 shows a recording format of a magnetic tape 120. On the magnetic tape 120, tracks T inclined with respect to the longitudinal direction of the magnetic tape 120 are sequentially formed. In this case, recording azimuths of two adjacent tracks T are made to be different from each other.

The end region of the track T at which the scanning is initiated and the end region of the track T at which the scanning is finished are respectively allocated to video data areas $ARV_L$, $ARV_U$. The video data areas $ARV_L$, $ARV_U$ record sync blocks related to the video data, which constitutes the recording data DDb output from the above-described ECC encoder 113.

The area interposed between the video areas $ARV_L$, $ARV_U$ in each of the tracks T is allocated to an audio data area ARA. The audio data area ARA records sync blocks related to the audio data, which constitutes the recording data DDb output from the above-described ECC encoder 113.

Figure 4:
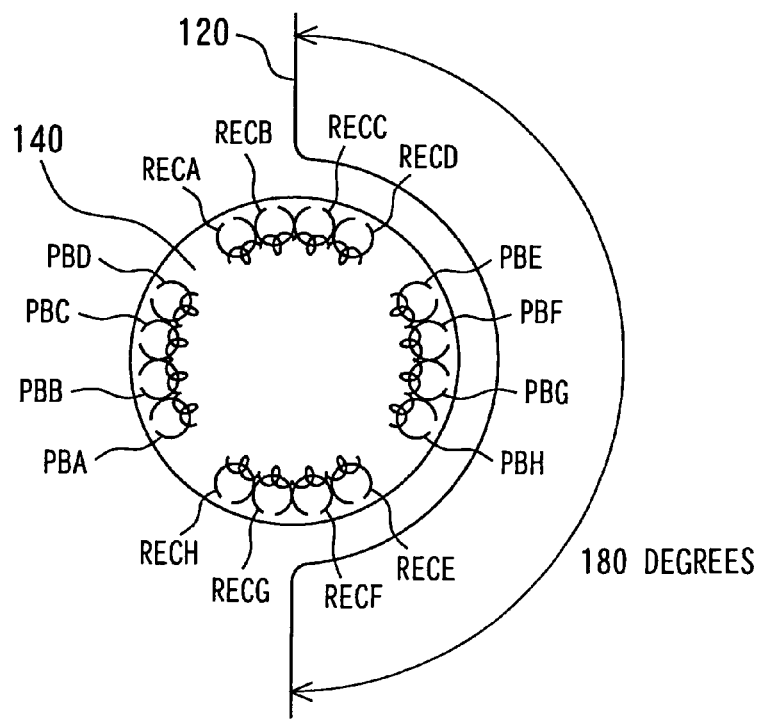
FIG. 4 is a diagram for illustrating an arrangement of magnetic heads.

FIG. 4 is a schematic diagram for showing a configuration of a rotating drum of the recording and reproduction apparatus 100 shown in FIG. 1. The magnetic tape 120 is obliquely wound around the rotating drum 140 at a winding angle of 180°. The magnetic tape 120 is traveled at a specific speed in a state that it is wound around the rotating drum 140.

On the rotating drum 140, four recording heads RECA to RECD are arranged, and additional four recording heads RECE to RECH are arranged at 180° angular interval from the four recording heads RECA to RECD. Further, on the rotating drum 140, eight reproduction heads PBA to PBH corresponding to the recording heads RECA to RECH are arranged at 90° angular interval from the recording heads RECA to RECH, respectively.

As described above, the recording head Hr of the recording and reproduction apparatus 100 shown in FIG. 1 is actually formed by eight recording heads RECA to RECH as described above. In addition, the reproduction head Hp of the recording and reproduction apparatus 100 shown in FIG. 1 is actually formed by eight reproduction heads PBA to PBH as described above. Video data and audio data of one field are recorded on twelve tracks. At the time of recording and reproduction, four tracks are simultaneously scanned by four heads in one scan (i.e. scanning operation), and therefore, twelve tracks is completely scanned when scanning operation is conducted three times.

Figure 5:
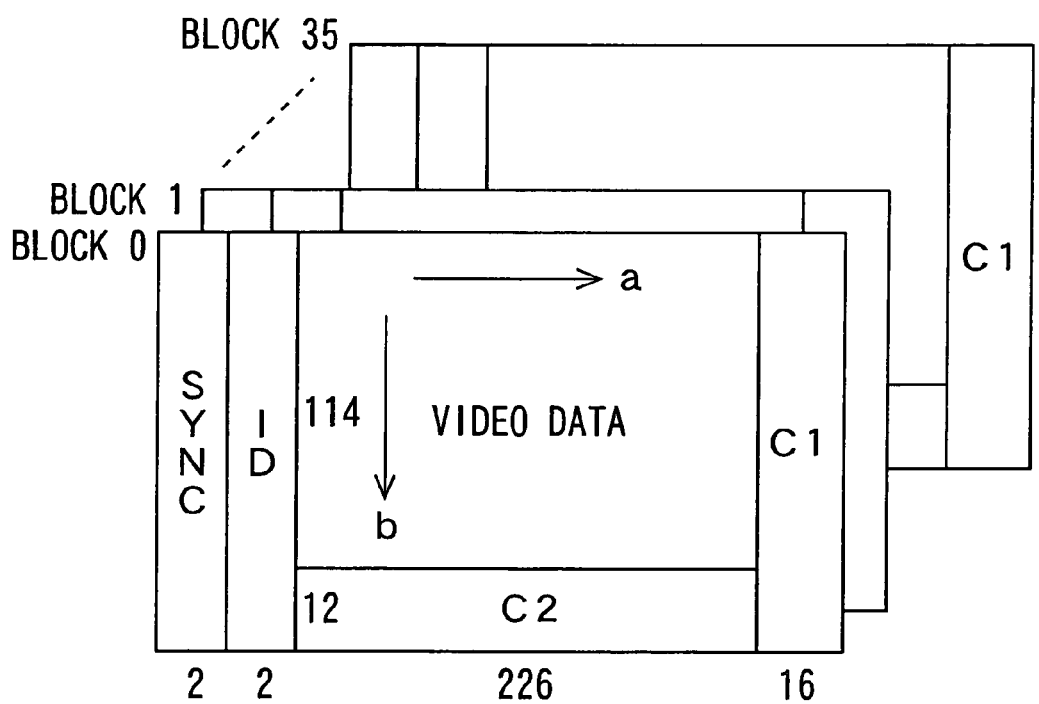
FIG. 5 is a diagram for showing a configuration of an ECC block of video data.

The video data areas $ARV_L$, $ARV_U$ of twelve tracks record 36 ECC blocks from block 0 to block 35 (data in encoding units) as shown in FIG. 5. One ECC block is constituted as follows. Specifically, for the video data constituted by a data array of 226×114 bytes, data in each column (data string) is encoded according to (126, 114) the Reed-Solomon code, for example, in the external encoding calculation data stream shown by an arrow "b" to generate a C2 parity of twelve bytes (external encoding parity). In addition, for the video data and the C2 parity, data in each row (data string) is encoded according to (242, 226) the Reed-Solomon code, for example, in the internal encoding calculation data stream shown by an arrow "a" to generate C1 parity of 16-byte. At a leading end of each data string, sync data and ID each having a size of 2-byte are arranged.

Figure 6:
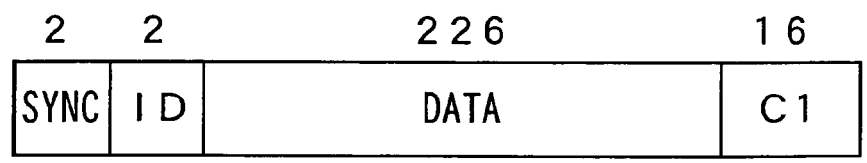
FIG. 6 is a diagram for showing a configuration of one sync block of video data.

FIG. 6 shows a configuration of one sync block having the ECC blocks (video data). Two bytes at the leading end are sync data. The subsequent two bytes are ID. The ID includes a track ID for identifying which track among twelve tracks records this one sync block and a sync block ID for identifying which sync block among the plurality of sync blocks recorded on one inclined track is this one sync block.

For example, the sync block ID is constituted as 9-bit data. In this case, one bit indicates whether this one sync block is recorded in the video data area $ARV_L$, located at an end side at which the scanning is initiated, or in the audio data area $ARV_U$, located at an end side at which the scanning is finished. The remaining 8 bits give numeric values from 0 to 188 respectively corresponding to 189 sync blocks recorded in the areas $ARV_L$, $ARV_U$, respectively.

Further, one segment is constituted for every twelve tracks, and segment numbers from 0 to 3 are repeatedly allocated to the segments sequentially. The two-byte ID described above also includes a segment ID indicating the segment number of the segment that records this one sync block.

The ID is followed by 226-byte video data (or a C2 parity) and a 16-byte C1 parity.

As described above, 36 ECC blocks (see FIG. 5) are recorded on twelve tracks of the magnetic tape 120. FIG. 7 shows an arrangement of sync blocks in each ECC block in the video data areas $ARV_L$, $ARV_U$ in twelve tracks, which constitute one segment.

As shown in FIG. 7A, in four tracks 0 to 3, which are scanned for the first time, the video data area $ARV_L$ records sync blocks of 21 rows from 0th to 20th rows in each of the ECC blocks 0 to 35, whereas the video data area $ARV_U$ records sync blocks of 21 rows from 21st to 41st rows in each of the ECC blocks 0 to 35.

In four tracks 4 to 7, which are scanned for the second time, the video data area $ARV_L$ records sync blocks of 21 rows from 42nd to 62nd rows in each of the ECC blocks 0 to 35, whereas the video data area $ARV_U$ records sync blocks of 21 rows from 63rd to 83rd rows in each of the ECC blocks 0 to 35.

In four tracks 8 to 11, which are scanned for the third time, the video data area $ARV_L$ records sync blocks of 21 rows from 84th to 104th rows in each of the ECC blocks 0 to 35, whereas the video data area $ARV_U$ records sync blocks of 21 rows from 105th to 125th rows in each of the ECC blocks 0 to 35.

Here, the sync blocks of the 0th row are constituted by the 0th sync block in each of the ECC blocks 0 to 35. As is shown in FIG. 7B, these 36 sync blocks are divided into 9 groups of sync blocks when they are recorded on the tracks 0 to 4. Specifically, the track 0 records 0th sync blocks in each of the ECC blocks 0, 18, 1, 19, 2, 20, 3, 21, and 4; the track 1 records 0th sync blocks in each of the ECC blocks 22, 5, 23, 6, 24, 7, 25, 8, and 26; the track 2 records 0th sync blocks in each of the ECC blocks 9, 27, 10, 28, 11, 29, 12, 30, and 13; and the track 3 records 0th sync blocks in each of the ECC blocks 31, 14, 32, 15, 33, 16, 34, 17, and 35.

Hereinafter, in the same manner as described above, the sync blocks of the 1st to 125th rows are respectively constituted by 1st to 125th sync blocks in each of the ECC blocks. The sync blocks are divided into four groups of nine sync blocks when they are recorded on the corresponding four tracks. In this case, the ECC blocks taken out from the nine sync blocks recorded on the individual four tracks are shuffled for every row and rotated. As shown in FIG. 7C, one sync block is constituted by two-byte sync data, two-byte ID, 226-byte video data (or a C2 parity), and a 16-byte C1 parity.

Here, the sync blocks of the 0th to 125th rows are sequentially recorded on the tracks 0 to 11. In this case, the sync blocks of the 0th to 113 rows are respectively constituted by adding a C1 parity to data string of the video data, which constitutes an internal encoding calculation data stream, whereas the sync blocks of the 114th to 125th rows are respectively constituted by adding a C1 parity to a data string of the C2 party, which constitutes an internal encoding calculation data stream.

Figure 8:
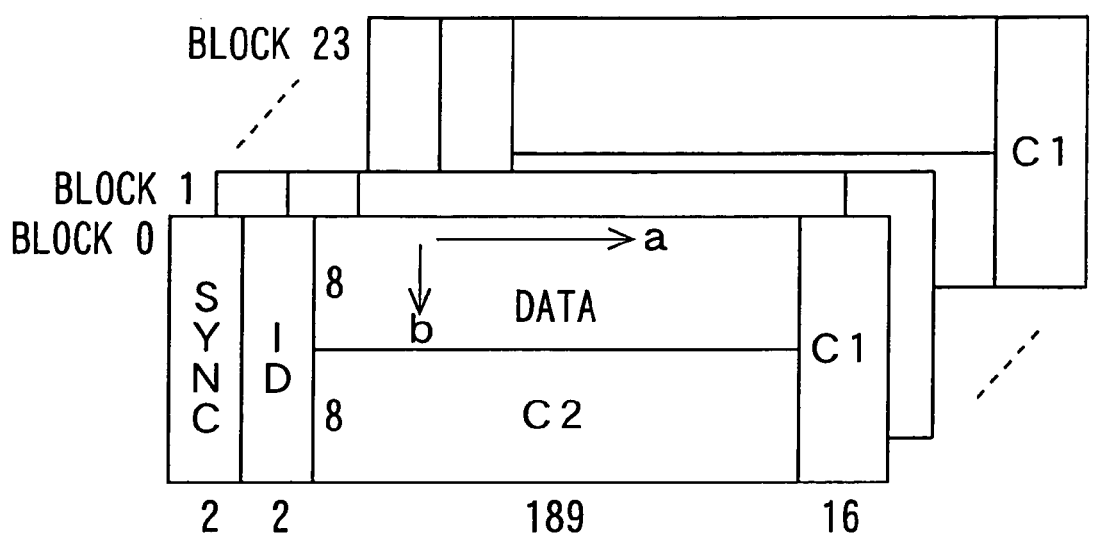
FIG. 8 is a block diagram for showing a configuration of an ECC block of audio data.

As shown in FIG. 8, 24 ECC blocks from a block 0 to block 23 (data in encoding units) are recorded into the audio data area ARA in twelve tracks. One ECC block is constituted as follows. Specifically, for the audio data constituted by an 189×8 byte data array, data in each column (data string) is encoded according to (16, 8) Reed-Solomon code, for example, in the external encoding calculation data stream shown by an arrow "b" to generate a C2 parity of eight-byte (external encoding parity). For the video data and the C2 parity, data in each row (data string) is also encoded according to (205, 189) Reed-Solomon code, for example, in the internal encoding calculation data stream shown by an arrow "a" to generate a C1 parity of 16 bytes. At a leading end of each data string, sync data and ID each having a size of two bytes are arranged.

Figure 9:
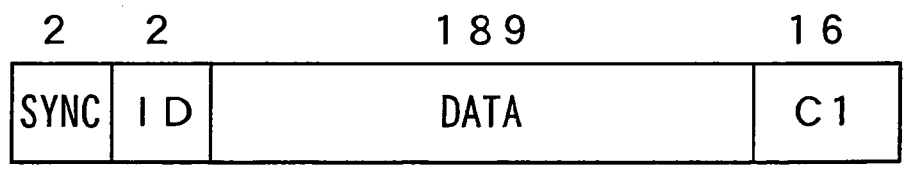
FIG. 9 is a diagram for showing a configuration of one sync block of audio data.

FIG. 9 shows a configuration of one sync block in each ECC block (audio data). Two bytes at the leading end are sync data. The subsequent two bytes are ID. The ID includes a track ID for identifying which track among twelve tracks records this one sync block and a sync block ID for identifying which sync block among the plurality of sync blocks recorded on one inclined track is this one sync block.

For example, the sync block ID is constituted as 9-bit data. In this case, one bit indicates whether this one sync block is recorded on a first-half portion of the audio data area ARA, located at an end side at which the scanning is initiated, or on a latter-half portion of the audio data area ARA, located at an end side at which the scanning is finished. The remaining 8 bits give numeric values of 224 to 227, 232 to 235, 240 to 243, and 248 to 251 respectively corresponding to 16 sync blocks to be recorded on the first-half portion and the latter-half portion.

Further, one segment is constituted for every twelve tracks, and segment numbers from 0 to 3 are repeatedly allocated to the segments sequentially. The two-byte ID described above also includes a segment ID indicating the segment number of the segment that records this one sync block. In other words, segment numbers for identifying each field are allocated to the sync blocks in a cycle of 4 fields.

The ID is followed by 189-byte audio data (or a C2 parity) and a 16-byte C1 parity.

Here, two ECC blocks include audio data of one field, which can be transmitted through one channel. Therefore, twenty-four ECC blocks include audio data of one field, which can be transmitted through twelve channels. In this case, the audio data to be transmitted through an N channel (N=0 to 11) is included in the ECC blocks of the block N and the block N+12.

FIG. 10 shows sampled data of audio data of one field to be provided to the ECC blocks of block N and the block N+12. In this embodiment, as described above, the description is made on an assumption that the video data Vin has a frame frequency of 23.97 Hz and the audio data has a sampling frequency of 48 kHz. The number of items of the sampled data per one field is 1001 items from S0 to S1000. Data of one sample is composed of 24 bits (3 bytes).

In the ECC block of the block N, items of the sampled data with even numbers from S0, S2, S4, . . . , to S1000 are arranged in such a manner that they are continuous along the external encoding calculation data stream shown by an arrow "b". On the other hand, in the ECC block of block N+12, items of the sampled data with odd numbers from S1, S3, S5, . . . , S999 are arranged in such a manner that they are continuous along the external encoding calculation data stream shown by an arrow "b". The data 0-0 to data 5-2 are auxiliary data such as format and time code.

Figure 11:
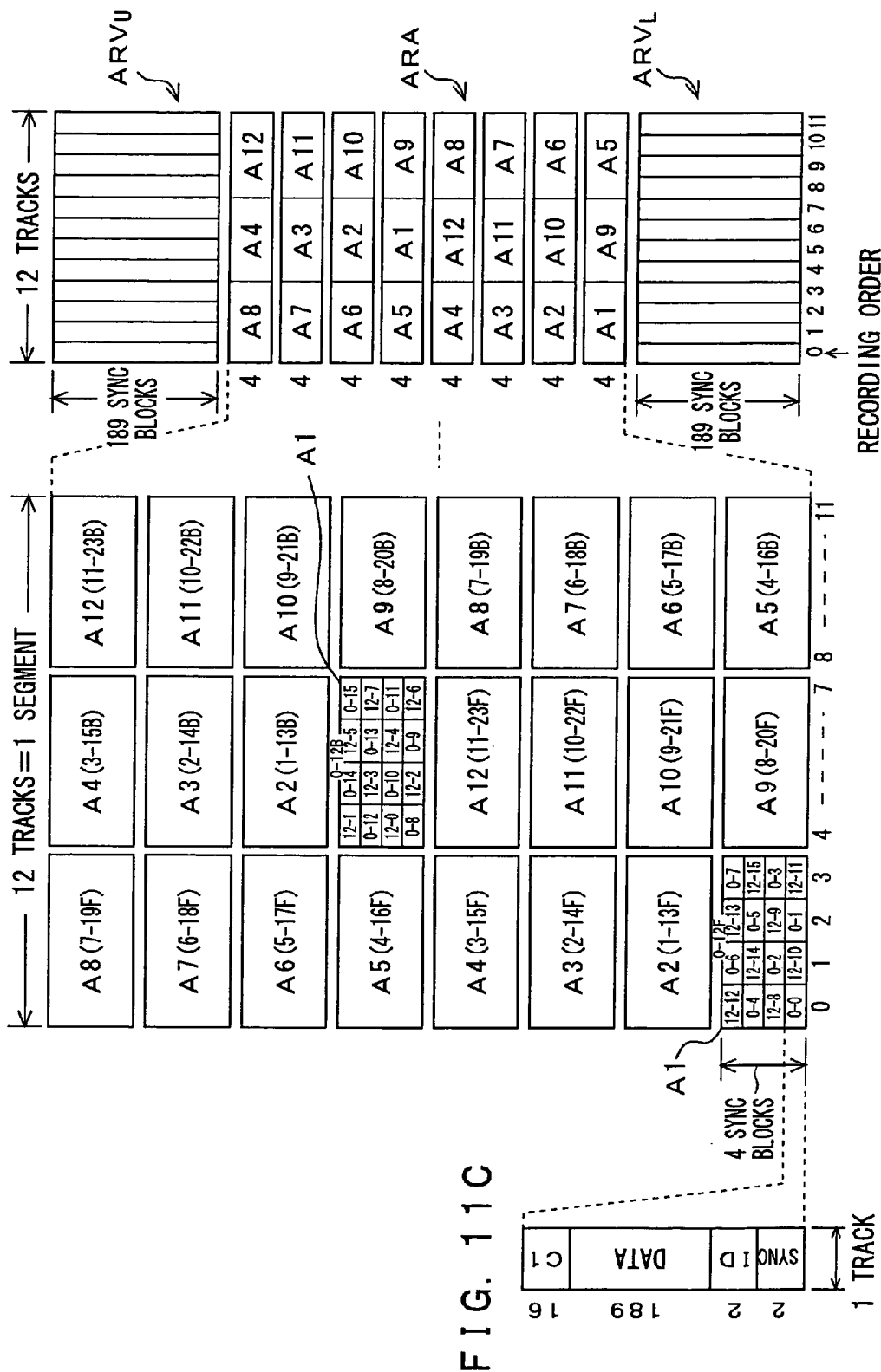
FIGS. 11A to 11C are diagrams each for illustrating an arrangement of sync blocks (audio data) within twelve tracks.

As described above, 24 ECC blocks are recorded on twelve tracks of the magnetic tape 120 (see FIG. 8). FIG. 11 shows an arrangement of sync blocks in each ECC block in the audio data area ARA on twelve tracks, which constitute one segment.

As shown FIG. 11A, eight recording portions from A1 to A8 are present in the audio data area ARA on four tracks from 0 to 3, which are scanned for the first time. Further, eight recording portions from A9 to A12 and A1 to A4 are present in the audio data area ARA on four tracks from 4 to 7, which are scanned for the second time. Eight recording portions from A5 to A12 are present in the audio data area ARA on four tracks from 8 to 11, which are scanned for the third time.

As shown in FIG. 11B, each of the recording portions A1 to A12 records sync blocks in an ECC block including the audio data of 0 to 11 channels. Specifically, the sync blocks in ECC blocks of N and N+12 blocks including audio data of N channels (N=0 to 11) are respectively allocated to either one of two recording portions A (N+1) for recording.

In FIG. 11B, x-yF indicates that the first-half sync blocks in the x and y ECC blocks are recorded, and x-yB indicates that the latter-half sync blocks in the x and y ECC blocks are recorded. In this case, the first-half sync blocks include 0 to 7th sync blocks of x ECC block and 8 to 15th sync blocks of y ECC block. The latter-half sync blocks include 8 to 15th sync blocks of x ECC block and 0 to 7th sync blocks of y ECC block.

For example, a recording portion A1 on four tracks from 0 to 3 records first-half 16 sync blocks in ECC blocks of 0 and 12, which include audio data of 0 channel. A recording portion A1 on four tracks from 4 to 7 records latter-half 16 sync blocks in ECC blocks of 0 and 12 blocks, which include an audio data of the 0 channel.

As shown in FIG. 11C, one sync block is composed of 2-byte sync data, 2-byte ID, 189-byte audio data (or a C2 parity), and a 16-byte C1 parity.

Figure 12:
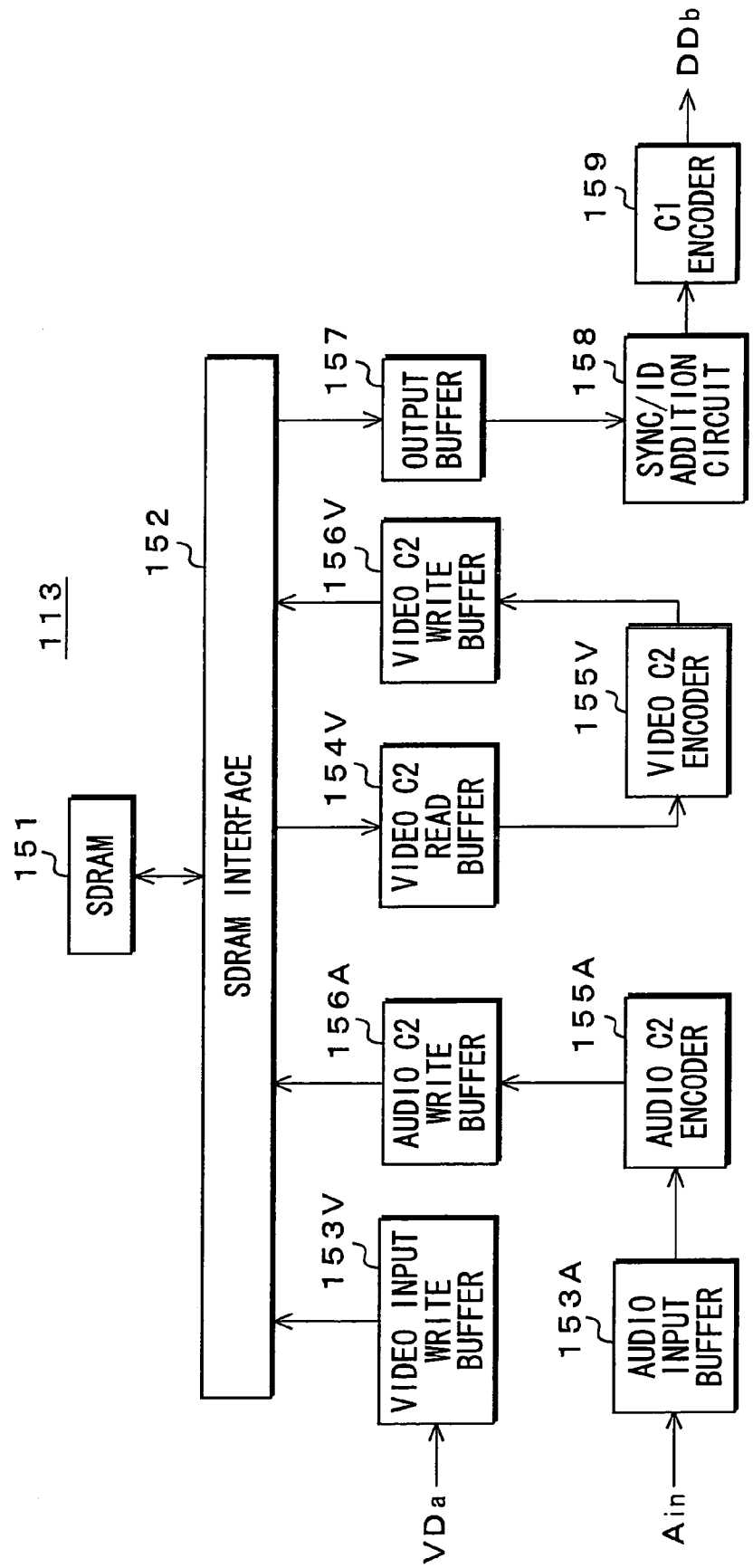
FIG. 12 is a block diagram for showing a configuration of an ECC encoder.

Next, an ECC encoder 113 in the recording and reproduction apparatus 100 shown in FIG. 1 will be described in detail. FIG. 12 shows a configuration of the ECC encoder 113.

The ECC encoder 113 includes a synchronous dynamic RAM (SDRAM) 151, and an SDRAM interface 152, which is an interface for writing and reading into and from the SDRAM 151. The SDRAM 151 has a capacity capable of storing video data and audio data of a plurality of fields, for example, 6 fields.

In this case, in the SDRAM 151, memory spaces corresponding to 36 ECC blocks (see FIG. 5) are prepared for each field of video data. In addition, in the SDRAM 151, memory spaces corresponding to 24 ECC blocks (see FIG. 8) are prepared for each field of audio data.

The ECC encoder 113 also includes a video input write buffer 153V, which is used as a buffer for writing the video data (compression-encoded data) supplied from the video compression circuit 112 (see FIG. 1) into the SDRAM 151. Here, the buffer 153V also constitutes a packing device for packing the video data (compression-encoded data) VDa supplied from the video compression circuit 112 into the sync block.

Figure 13:
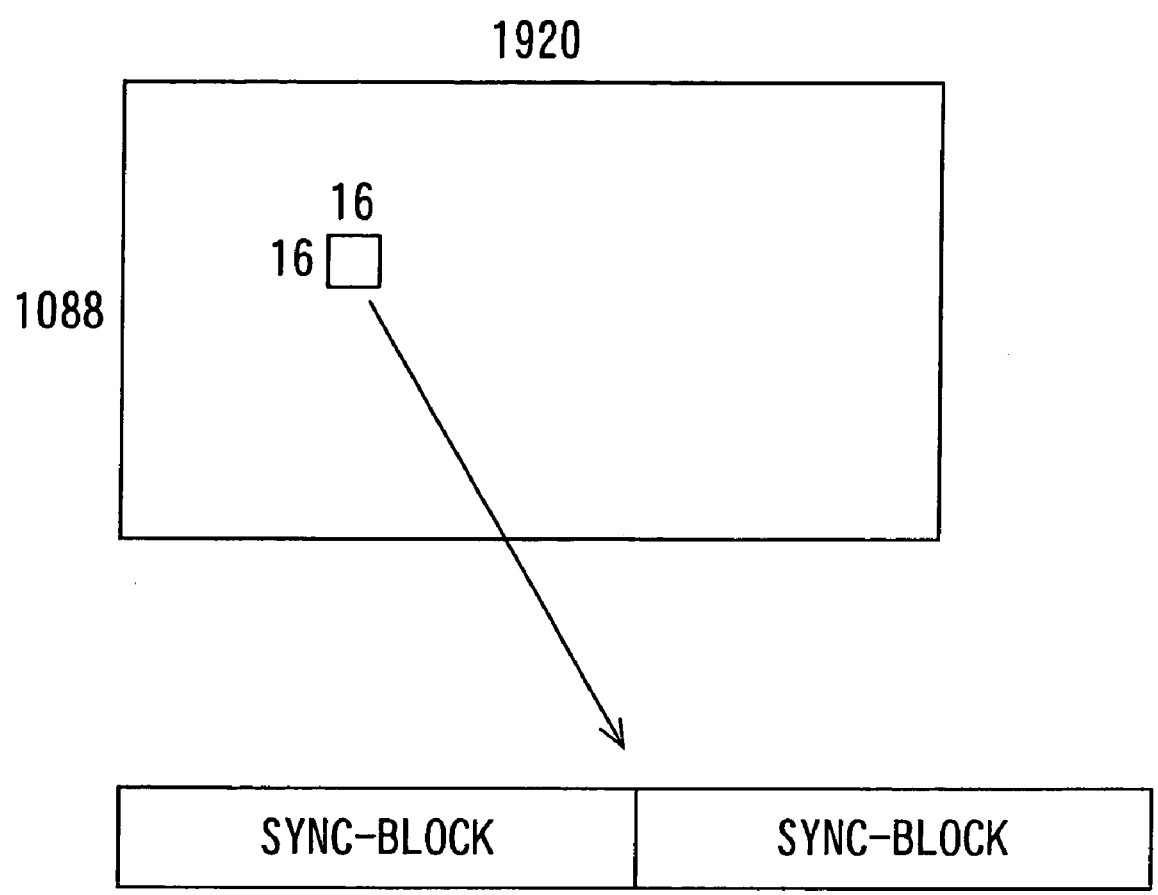
FIG. 13 is a diagram for illustrating a relationship between a macro block and a sync block (video data)

As described above, the video compression circuit 112 divides the video data Vin into two-dimensional blocks of 8×8 pixels, for example, and then performs data-compression for the resultant video data by use of block encoding such as DCT. Although not described above, the effective screen is constituted by 1920 pixels×1088 lines. The input write buffer 153V packs the video data for each compression-encoded data, for example, in a macro-block of 16×16 pixels into two sync blocks, as shown in FIG. 13.

In the SDRAM 151, the sync blocks into which the compression-encoded data in each macro-block has been packed are sequentially written into memory spaces corresponding to 36 ECC blocks, for each field. As shown in FIG. 7, the sync blocks of 36 ECC blocks are respectively shuffled and recorded on the inclined tracks.

The encoder 113 also includes a video C2 read buffer 154V, which is used as a buffer for supplying the video data corresponding to 36 ECC blocks related to the video data, read from the SDRAM 151, to a later-described video C2 encoder 155V for each field. The encoder 113 further includes a video C2 encoder 155V for calculating a C2 parity (an external encoding parity) in the respective 36 ECC blocks related to the video data for each field.

The ECC encoder 113 further includes a video C2 write buffer 156V, which is used as a buffer for writing the C2 parity in the respective 36 ECC blocks calculated in the C2 encoder 155V to the SDRAM 151 for each field.

The ECC encoder 113 further includes an audio input buffer 153A for supplying the audio data Ain, which has been input into the input terminal 111A (see FIG. 1), to a later-described audio C2 encoder 155A. The ECC encoder 113 further includes an audio C2 encoder 155A for calculating a C2 parity (an external encoding parity) in the respective 24 ECC blocks related to the audio data for each field.

The ECC encoder 113 further includes an audio C2 write buffer 156A, which is used as a buffer for writing the audio data Ain and the C2 parity calculated in the C2 encoder 155A into the SDRAM 151 for each field. In the SDRAM 151, the audio data Ain and the C2 parity of each channel are sequentially written into the memory spaces corresponding to two ECC blocks for each field.

The ECC encoder 113 further includes a SYNC/ID addition circuit 158 for adding sync-data and ID to data string of each sync block related to the video data or audio data, which is output from the output buffer 157 in the order that the video data or the audio data have been recorded. The ECC encoder 113 further includes a C1 encoder 159 for calculating a C1 parity and adding it to the video data of each sync block to which the sync-data and ID have been added in the SYNC/ID addition circuit 158 and then for outputting the resultant data as recording video data DDb. In this case, a video and an audio also serves as the C1 encoder 159, and its parameter such as code length and the like is determined at an initial sync block when use.

Operations of the ECC encoder 113 shown in FIG. 12 will be described.

The video data (compression-encoded data) VDa supplied from the video compression circuit 112 (see FIG. 1) is written into the SDRAM 151 via the video input write buffer 153V and the SDRAM interface 152. In this case, for each item of compression encoded data in a macro-block of 16×16 pixels, the video data is packed into two sync blocks. These sync blocks are then sequentially written into the memory spaces corresponding to 36 ECC blocks for each field.

Further, the video data corresponding to 36 ECC blocks related to the video data read from the SDRAM 151 is supplied to the video C2 encoder 155V via the SDRAM interface 152 and the video C2 read buffer 154V for each field.

The C2 encoder 155V calculates a C2 parity in the respective 36 ECC blocks for each field. The C2 parity in the respective 36 ECC blocks, which is calculated in the C2 encoder 155V for each field, is written into the C2 parity area in the memory space of the SDRAM 151 corresponding one of 36 ECC blocks via the video C2 write buffer 156V and the SDRAM interface 152.

Further, the audio data Ain supplied from the input terminal 111A (see FIG. 1) is supplied to the audio C2 encoder 155A via the audio input buffer 153A. The C2 encoder 155A calculates the C2 parity in the respective 24 ECC blocks for each field.

The C2 parity in the respective 24 ECC blocks calculated in the C2 encoder 155A and audio data Ain are written into the memory space of the SDRAM 151 corresponding one of 24 ECC blocks in the SDRAM 151 via the audio C2 write buffer 156A and the SDRAM interface 152 for each field.

The video data corresponding to 36 ECC blocks related to the video data and the C2 parity, which are read from the SDRAM 151, as well as the audio data corresponding to the 24 ECC blocks related to the audio data and the C2 parity are supplied to the output buffer 157 for each field. Each sync block related to the video data or audio data, which is output from the output buffer 157 in the order that the video data or audio data has been recorded is supplied to the C1 encoder 159 after sync data and ID are added to the sync block in the SYNC/ID addition circuit 158.

The C1 encoder 159 calculates a C1 parity for the video data in each sync block to which the sync data and ID have been added and adds the C1 parity to the video data, so as to produce each sync block as recording data DDb. The recording data DDb is supplied to the recording amplifier 114 as described above (see FIG. 1).

Figure 14:
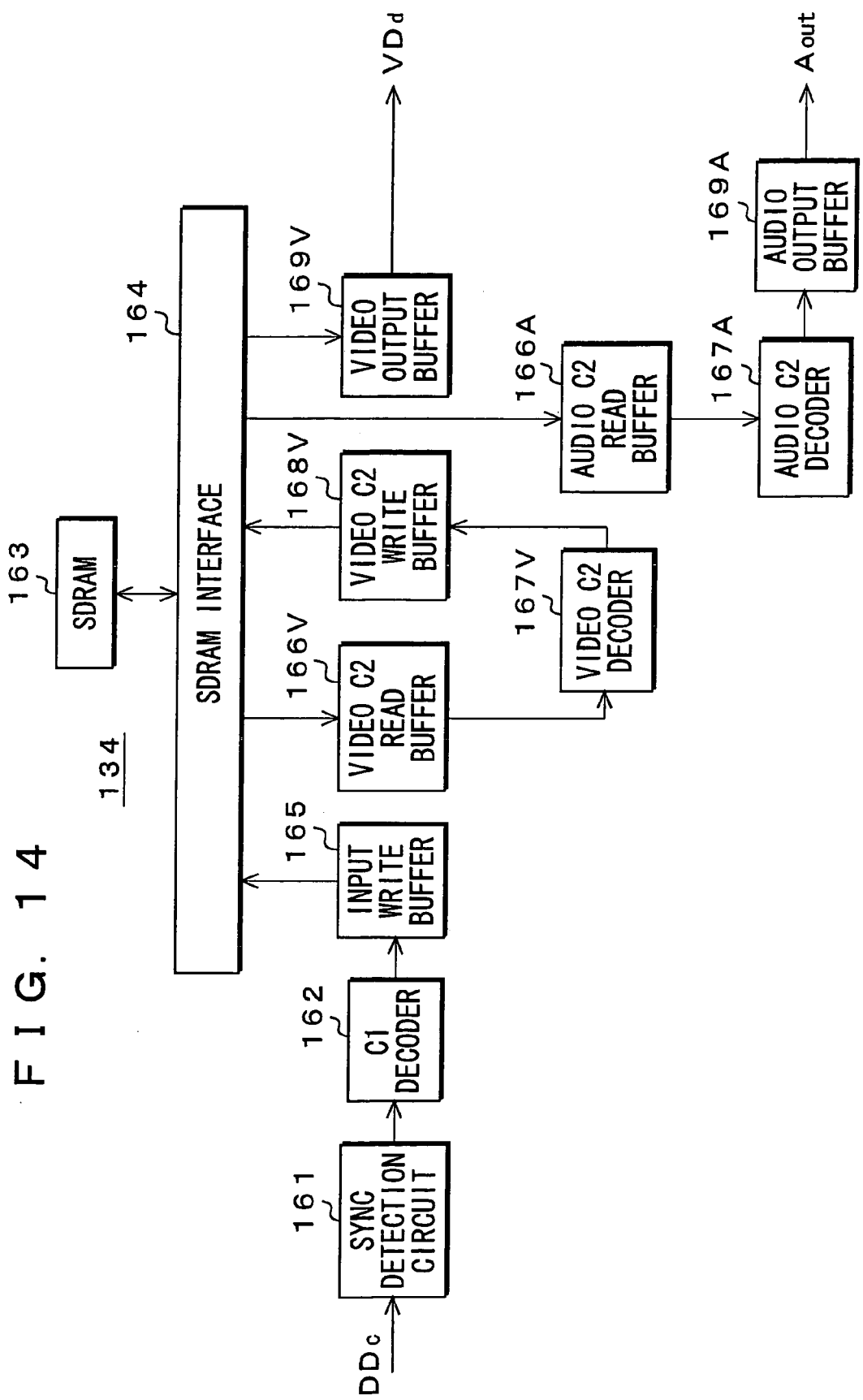
FIG. 14 is a block diagram for showing a configuration of an ECC decoder.

Next, the ECC decoder 134 in the recording and reproduction apparatus 100 shown in FIG. 1 will be described in detail. FIG. 14 shows a configuration of the ECC decoder 134.

The ECC decoder 134 includes a sync detection circuit 161 for detecting sync data in each sync block, which constitutes reproduction data DDc supplied from the decoding circuit 133 (see FIG. 1). The ECC decoder 134 also includes a C1 decoder 162 for receiving sync data in each sync block via the sync detection circuit 161 and performing error correction for each sync block by use of a C1 parity. In this case, a video and an audio also serves as the C1 decoder 162 so that its parameter such as code length is determined at an initial sync block and the C1 decoder 162 is then used.

The C1 decoder 162 outputs each sync block in the state that an error correction flag for indicating whether or not the error correction has been executed and ID are added to the error-corrected video data string or audio data string. The error correction flag is inserted into a portion of sync data. In this case, when the error correction flag indicates that the error correction has been executed, no error is included in the data string to which this error correction flag is added. On the other hand, when the error correction flag indicates that the error correction has not been executed, an error is included in the data string to which the error correction flag is added.

The ECC decoder 134 also includes an SDRAM 163, and a SDRAM interface 164 for writing and reading into and from the SDRAM 163. The SDRAM 163 has a capacity capable of storing video data and audio data of a plurality of fields, for example, 6 fields.

In this case, in the SDRAM 163, memory spaces corresponding to 36 ECC blocks (see FIG. 5) are prepared for each field of video data. In addition, in the SDRAM 163, memory spaces corresponding to 24 ECC blocks (see FIG. 8) are prepared for each field of audio data.

The ECC decoder 134 further includes an input write buffer 165, which is used as a buffer for writing each sync block supplied from the C1 decoder 162 into the SDRAM 163.

Here, since the C2 decoder performs error correction by use of a C2 parity, which will be described later, the input write buffer 165 writes all of the sync blocks into the SDRAM 163 regardless of the state of the error correction flag added.

In this case, each sync block related to video data is written into a specific address position in the memory space corresponding to one of 36 ECC blocks for each field, based on the track ID and the sync block ID added to the sync block. As a result, in the SDRAM 163, 36 ECC blocks each composed of the same 126 sync blocks as in recording are produced for each field.

Further, in this case, each sync block related to audio data is written into a specific address position in the memory space corresponding to one of 24 ECC blocks for each field, based on the track ID and the sync block ID added to the sync block. As a result, in the SDRAM 163, 24 ECC blocks each composed of the same 16 sync blocks as in recording are produced for each field.

The ECC decoder 134 further includes a video C2 read buffer 166V, which is used as a buffer for supplying data of each sync block in the respective 36 ECC blocks related to the video data, read from the SDRAM 163, to a later-described video C2 decoder 167V for each field. The ECC decoder 134 further includes a video C2 decoder 167V for performing error correction in 36 ECC blocks by use of the C2 parity for each field. The ECC decoder 134 still further includes a video C2 write buffer 168V, which is used as a buffer for writing video data (compression encoded data) in 36 ECC blocks, corrected in the C2 decoder 167V, into the SDRAM 163 for each field.

The ECC decoder 134 further includes a video output buffer 169, which is used as a buffer for outputting compression encoded data in each macro-block for each field, based on 36 ECC blocks related to video data recorded in the SDRAM 163. In this case, the video output buffer 169V performs depacking to capture compression encoded data in each macro-block from the corresponding sync block.

The ECC decoder 134 further includes an audio C2 read buffer 166A, which is used as a buffer for supplying data of each sync block in 24 ECC blocks related the audio data, read from the SDRAM 163, to a later-described audio C2 decoder 167A for each field. The ECC decoder 134 still further includes an audio C2 decoder 167A for performing error correction in 24 ECC blocks by use of a C2 parity, for each field. The ECC decoder 134 further includes an audio output buffer 169A, which is used as a buffer for outputting audio data in 24 ECC blocks, corrected in the C2 decoder 167A, that is, audio data of twelve channels.

Operations of the ECC decoder 134 shown in FIG. 14 will be described.

In the sync detection circuit 161, sync data is detected from the reproduction data DDc supplied from the decoding circuit 133 and then is supplied to the C1 decoder 162. The C1 decoder 162 performs error correction for each sync block by use of a C1 parity. The C1 decoder 162 outputs each sync block in a state that an error correction flag indicating whether or not error correction has been executed and ID are added to the error-corrected data string.

Each sync block output from the C1 decoder 162 is written into the SDRAM 163 via the input write buffer 165 and the SDRAM interface 164.

In this case, each sync block related to the video data is written into a specific address position in the memory space corresponding to one of 36 ECC blocks for each field, based on the track ID and the sync block ID added to the sync block. As a result, in the SDRAM 163, 36 ECC blocks each composed of the same 126 sync blocks as in recording are produced for each field.

Further, in this case, each sync block related to audio data is written into a specific address position in the memory space corresponding to one of 24 ECC blocks for each field, based on the track ID and the sync block ID added to the sync block. As a result, in the SDRAM 163, 24 ECC blocks each composed of the same 16 sync blocks as in recording are produced for each field.

Further, data of each sync block in 36 ECC blocks related to the video data is read from the SDRAM 163, and is supplied to the video C2 decoder 167V via the SDRAM interface 164 and the video C2 read buffer 166V for each field. The C2 decoder 167V performs error correction in 36 ECC blocks by use of a C2 parity for each field. Then, the video data (compression encoded data) in 36 ECC blocks, corrected in the C2 decoder 167V, is written into the SDRAM 163 via the video C2 write buffer 168V and the SDRAM interface 164 for each field.

Further, compression encoded data in each macro-block is read for each field, based on 36 ECC blocks related to the video data stored in the SDRAM 163, and is output as output video data VDd via the output buffer 169V. In this case, the output buffer 169V performs depacking to capture compression encoded data in each macro-block from the corresponding sync block.

Further, data of each sync block in 24 ECC blocks related to the audio data is read from the SDRAM 163 for each field, and is supplied to the audio C2 decoder 167A via the SDRAM interface 164 and the audio C2 read buffer 166A. The C2 decoder 167A performs error correction in 24 ECC blocks for each field by use of a C2 parity.

Then, audio data in 24 ECC blocks, corrected in the C2 decoder 167A, that is, audio data of twelve channels, are output as output audio data Aout via the audio output buffer 169A.

As described above, in this embodiment, the video data Vin having a frame frequency of 23.97 Hz is recorded on the magnetic tape 120, and the audio data Ain having a sampling frequency of 48 kHz is also recorded on the magnetic tape in correspondence with this video data Vin. In this case, 1001 items of the sampled audio data related to the audio data Ain are recorded per one channel for each field.

In the normal reproduction, the tape traveling speed of the magnetic tape 120 and the rotation speed of the rotation head are set to be identical to those at the time of recording, so as to produce video data Vout having a frame frequency of 23.97 Hz from the magnetic tape 120. In this case, audio data for each field, which is sequentially supplied from the ECC decoder 134, is output from the rate converter 137 with the number of the sampled audio data being kept at the original 1001 items (this number corresponds to the sampling frequency of 48 kHz). In this manner, audio data Aout having a sampling frequency of 48 kHz and corresponding to the video data Vout is produced.

In the compatibility reproduction, the tape traveling speed of the magnetic tape 120 and the rotation speed of the rotating head are set to be 25/23.97 times higher than at the time of recording. In this case, audio data of each field, which is sequentially supplied from the ECC decoder 134, is output from the rate converter 137 with the number of items of the sampled audio data being converted from 1001 items(this number corresponds to the sampling frequency of 50.01 kHz) to 960 items (this number corresponds to the sampling frequency of 48 kHz). As a result, audio data Aout having a sampling frequency of 48 kHz and corresponding to the video data Vout is produced.

As described above, in the normal reproduction, the audio data, which has been recorded on the magnetic tape 120, is reproduced without converting the number of items of the sampled data thereof and used as it is. This prevents the number of items of the sampled data from reducing to avoid bandwidth limitation and filter rounding error in the rate converter 137, thereby resulting in no deterioration in sound quality.

In the above embodiment, an example is shown where the first frame frequency is 23.97 Hz and the second frame frequency is 25 Hz. However, the present invention is not limited to these frame frequencies. Alternatively, the present invention may also be applicable to the case where the first frame frequency is 25 Hz and the second frame frequency is 23.97 Hz, for example.

In this case, the video data Vin having a frame frequency of 25 Hz is recorded on the magnetic tape 120, and at the same time, the audio data Ain having a sampling frequency of 48 kHz is also recorded on the magnetic tape 120 in correspondence with the video data Vin. In this case, 960 items of sampled data related to the audio data Ain are recorded per one channel for each field.

In the normal reproduction, the tape traveling speed of the magnetic tape 120 and the rotation speed of the rotation head are set to be identical to those at the time of recording, so as to reproduce video data Vout having a frame frequency of 25 Hz from the magnetic tape 120. In this case, audio data for each field, which is sequentially supplied from the ECC decoder 134, is output from the rate converter 137 with the number of the sampled audio data being kept at the original 960 items (this number corresponds to the sampling frequency of 48 kHz). In this manner, audio data Aout having a sampling frequency of 48 kHz and corresponding to the video data Vout is produced.

In the compatibility reproduction, the tape traveling speed of the magnetic tape 120 and the rotation speed of the rotating head are set to be 25/23.97 times higher than at the time of recording. In this state, video data Vout having a frame frequency of 23.97 Hz is reproduced from the magnetic tape 120. In this case, the audio data for each field, sequentially supplied from the ECC decoder 134, is output from the rate converter 137 with the number of their sampled data being converted from 960 items (this number corresponds to the sampling frequency of 46.02 kHz) to 1001 items (this number corresponds to the sampling frequency of 48 kHz). As a result, audio data Aout having a sampling frequency of 48 kHz corresponding to the video data Vout is produced.

Figure 15A:
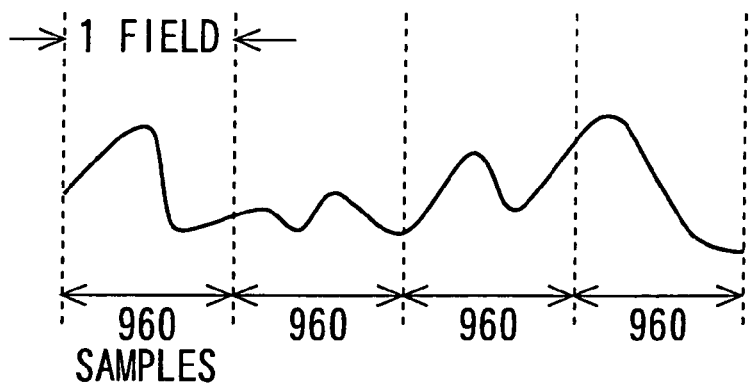
FIGS. 15A to 15C are diagrams each for illustrating a rate conversion performed in a compatibility reproduction where the frame frequency is converted from 25 Hz to 23.97 Hz.

FIG. 15A shows that 960 items of the sampled audio data related to the audio data Ain having a sampling frequency of 48 kHz are recorded in correspondence with each field of the video data Vin having a frame frequency of 25 Hz. In the normal reproduction, the video data Vout has a frame frequency of 25 Hz. This is identical to the frame frequency of the video data Vin at the time of recording. In this case, audio data Aout having a sampling frequency of 48 kHz is produced by using 960 items of the sampled audio data without any conversion, which are reproduced in each field of the video data Vout.

Figure 15B:
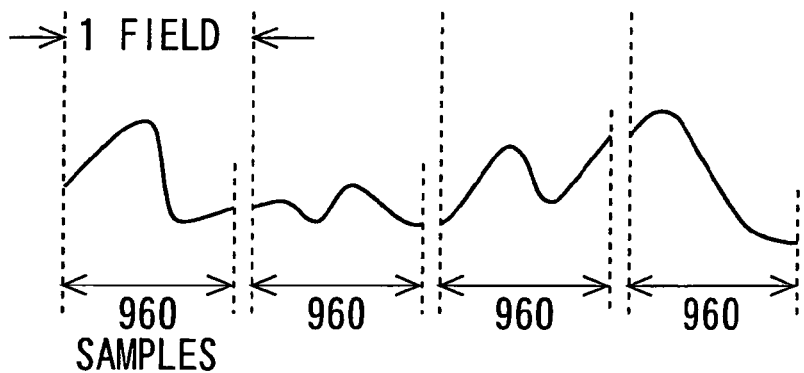

On the contrary, in the compatibility reproduction, the video data Vout has a frame frequency of 23.97 Hz. This is lower than the frame frequency of the video data Vin at the time of recording. If the audio data having a sampling frequency of 48 kHz is constituted by using 960 items of the sampled audio data without any conversion, which are reproduced in each field of the video data Vout, thus-constituted audio data has a period shorter than one field period as shown in FIG. 15B, and this is inconvenient.

Figure 15C:
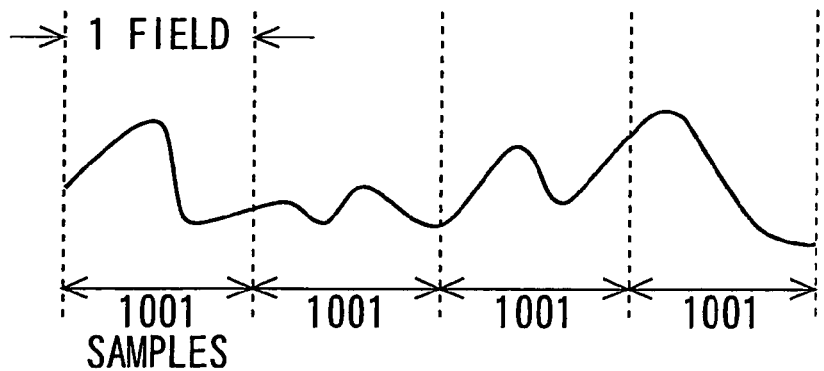

As described above, to avoid such an inconvenience, the number of items of the sampled audio data reproduced in each field of the video data Vout is converted from 960 items to 1001 items by the rate converter 137. Then, audio data having a sampling frequency of 48 kHz is constituted by use of 1001 items of sampled data obtained as a result of conversion in each field. As a result, as shown in FIG. 15C, thus-constituted audio data has a period equal to one field period, and audio data in each field can be satisfactorily continued.

In the above-described embodiment, sampled data for one field of the audio data having a sampling frequency of 48 kHz is recorded in each one field period onto the magnetic tape 120 in correspondence with video data Vin. In the compatibility reproduction, the number of items of the sampled data is converted for the audio data of each one field in the rate converter 137. However, the present invention is not limited thereto.

For example, the present invention is also applicable to a case where, for every specific period of time which is an integer times larger than or is smaller by a factor of integer than the frame period of the video data Vin, sampled audio data related to audio data having a specific sampling frequency is recorded onto the magnetic tape 120 for this specific period of time. In this case, in the compatibility reproduction, the number of items of the sampled data is converted for the audio data of each specific period of time, for example in the rate converter 137.

Further, in the above-described embodiment, sampled audio data of each one field of the audio data having a sampling frequency of 48 kHz is recorded onto the magnetic tape 120 every one field period of time in correspondence with the video data Vin. Alternatively, the present invention is also applicable to the case where only audio data having a sampling frequency of 48 kHz is recorded onto the magnetic tape 120 for every first period of time.

In this case, when audio data of the first period of time recorded on the magnetic tape 120 is reproduced every second period of time, which is different from the first period of time, audio data having a sampling frequency of 48 kHz is produced by converting the number of items of the sampled audio data of the audio data reproduced every second period of time by use of the rate converter 137.

In this case, when audio data of the first period of time recorded on the magnetic tape 120 is reproduced every first period of time, audio data having a sampling frequency of 48 kHz is also produced with the number of items of the sampled audio data of the audio data reproduced every first period of time being kept unchanged.

Therefore, in this case, the audio data recorded on the magnetic tape 120 is reproduced without converting the number of its sampled data and used as it is. This prevents the number of items of the sampled data from reducing to avoid bandwidth limitation and filter rounding error in the rate converter, thereby resulting in no deterioration in sound quality.

In addition, in the above-described embodiment, the magnetic tape 120 has been shown as a recording medium. It is obvious, however, that the present invention is also applicable to the case where other kinds of tape recording mediums and disk recording mediums are alternatively employed.

What is claimed is:

1. A data reproduction method for reproducing audio data from a recording medium in which said audio data is recorded every first period of time by a length of said first period of time, said audio data having a specific sampling frequency, said method comprising the steps of:

when said audio data of the first period of time recorded every said first period of time is reproduced every said first period of time, outputting said audio data reproduced every said first period of time with the number of items of sampled audio data being kept unchanged; and when said audio data of the first period of time recorded every said first period of time is reproduced every second period of time, said second period of time being different from said first period of time, outputting said audio data with the number of items of sampled audio data being converted into the number corresponding to said second period of time, said sampled audio data being reproduced every said second period of time.

2. A data reproduction method for reproducing video data and audio data from a recording medium in which said video data having a first frame frequency is recorded, and said audio data having a specific sampling frequency is recorded every specific period of time by a length of said specific period of time, said audio data corresponding to said video data, said specific period of time being any one of period of time integer times larger than the frame period of said video data and period of time smaller by a factor of integer than the frame period of said video data, comprising the steps of:
- when said video data is reproduced at said first frame frequency, outputting said audio data of said specific period of time with the number of items of sampled audio data being kept unchanged, said sampled audio data being sequentially reproduced in correspondence with said video data; and
- when said video data is reproduced at a second frame frequency that is different from said first frame frequency, outputting said audio data of said specific period of time with the number of items of sampled audio data being converted into the number of items corresponding to said second frame frequency, said sampled audio data being sequentially reproduced in correspondence with said video data.

3. The data reproduction method according to claim 2, wherein said specific time of period is one field period, said period being a half of the frame period of said video data.

4. The data reproduction method according to claim 2, wherein said recording medium is a tape recording medium, and
- wherein a plurality of sync blocks is recorded on every at least one of inclined tracks of said tape recording medium, each of said sync blocks being produced from said video data and said audio data of said specific period of time.

5. The data recording method according to claim 4, wherein said video data and said audio data of said specific period of time are respectively divided into at least one encoding unit, and error correction encoding is performed for each divided encoding unit by use of a product code, and
- wherein said sync block includes an internal encoding parity and a data string constituting an internal encoding calculation data stream.

6. A data reproduction apparatus, comprising:
- a reproducer for reproducing audio data from a recording medium in which said audio data is recorded every first period of time by a length of said first period of time, said audio data having a specific sampling frequency; and
- a rate converter for outputting, when said reproducer produces every said first period of time said audio data of the first period of time recorded every said first period of time, said audio data reproduced every said first period of time with the number of items of sampled audio data being kept unchanged, whereas for outputting, when said reproducer produces every second period of time said audio data of the first period of time recorded every said first period of time, said second period of time being different from said first period of time, said audio data with the number of items of sampled audio data being converted into the number corresponding to said second period of time, said sampled audio data being reproduced every said second period of time.

7. A data reproduction apparatus, comprising:
- a reproducer for reproducing video data and audio data from a recording medium in which said video data having a first frame frequency is recorded, and said audio data having a specific sampling frequency is recorded every specific period of time by a length of said specific period of time, said audio data corresponding to said video data, said specific period of tome being any one of period of time integer times larger than the frame period of said video data and period of time smaller by a factor of integer than the frame period of said video data; and
- a rate converter for outputting, when said video data is reproduced at said first frame frequency, said audio data of said specific period of time with the number of items of sampled audio data being kept unchanged, said sampled audio data being sequentially reproduced in correspondence with said video data, whereas for outputting, when said reproducer reproduces said video data at a second frame frequency that is different from said first frame frequency, said audio data of said specific period of time with the number of items of sampled audio data being converted into the number corresponding to said second frame frequency, said sampled audio data being sequentially reproduced in correspondence with said video data.

8. The data reproduction apparatus according to claim 7, wherein said specific time of period is one field period, said period being a half of the frame period of said video data.

9. The data reproduction method according to claim 7, wherein said recording medium is a tape recording medium, and
- wherein a plurality of sync blocks are recorded on every at least one of inclined tracks of said tape recording medium, each of said sync blocks being produced from said video data and said audio data of said specific period of time.

10. The data recording method according to claim 9, wherein said video data and said audio data of said specific period of time are respectively divided into at least one encoding unit, and error correction encoding is performed for each divided encoding unit by use of a product code, and
- wherein said sync block includes an internal encoding parity and a data string constituting an internal encoding calculation data stream.

* * * * *